United States Patent
Wada (10) Patent No.: US 7,515,943 B2
(45) Date of Patent: Apr. 7, 2009

(54) AUTOMOTIVE HANDS-FREE APPARATUS

(75) Inventor: Hironori Wada, Kariya (JP)

(73) Assignee: Denso Corporation, Kariya (JP)

( * ) Notice: Subject to any disclaimer, the term of this patent is extended or adjusted under 35 U.S.C. 154(b) by 559 days.

(21) Appl. No.: 11/081,044

(22) Filed: Mar. 15, 2005

(65) Prior Publication Data

US 2005/0202852 A1    Sep. 15, 2005

(30) Foreign Application Priority Data

Mar. 15, 2004    (JP) ............................. 2004-072766

(51) Int. Cl.
*H04B 1/38* (2006.01)
*H04M 1/00* (2006.01)

(52) U.S. Cl. ............... 455/569.1; 455/41.2; 455/569.2; 455/566

(58) Field of Classification Search ............. 455/41.2, 455/566, 561, 570, 552.1, 555, 556.1–2, 455/556.2, 557, 569.1–2, 569.2, 90.2, 41.1, 455/563, 567, 79, 550.1
See application file for complete search history.

(56) References Cited

U.S. PATENT DOCUMENTS

| | | | | |
|---|---|---|---|---|
| 6,081,724 A | * | 6/2000 | Wilson | ....................... 455/462 |
| 6,574,341 B1 | * | 6/2003 | Lee | ............................. 381/110 |
| 7,107,010 B2 | * | 9/2006 | Heinonen et al. | ........... 455/41.2 |
| 7,257,372 B2 | * | 8/2007 | Kaltenbach et al. | ........ 455/41.2 |
| 7,376,393 B2 | * | 5/2008 | Ono et al. | ................... 455/41.2 |
| 2003/0027607 A1 | * | 2/2003 | Hatakeyama et al. | ....... 455/569 |
| 2005/0113149 A1 | * | 5/2005 | Tamura et al. | ........... 455/569.1 |

FOREIGN PATENT DOCUMENTS

| | | |
|---|---|---|
| JP | 2001-326964 | 11/2001 |
| JP | 2002-171337 | 6/2002 |
| JP | 2003-115917 | 4/2003 |

OTHER PUBLICATIONS

Office Action dated Sep. 11, 2007 from corresponding Japanese Patent Application No. 2004-072766 (with translation).

* cited by examiner

*Primary Examiner*—John J Lee
(74) *Attorney, Agent, or Firm*—Harness, Dickey & Pierce, P.L.C.

(57) ABSTRACT

An automotive hands-free apparatus, connectable via wireless connection with a portable phone, has the capability of temporarily disconnecting a wireless communication line to this portable phone in response to a user's input instructing disconnection of the communication line to this portable phone.

4 Claims, 5 Drawing Sheets

AUTOMOTIVE HANDS-FREE APPARATUS

CROSS-REFERENCE TO RELATED APPLICATION

This application is based upon and claims the benefit of priority from earlier Japanese Patent Application No. 2004-72766 filed on Mar. 15, 2004 so that the description of which is incorporated herein by reference.

BACKGROUND OF THE INVENTION

The present invention relates to an automotive hands-free apparatus capable of communicating via wireless connection with a portable phone.

Conventionally, it is known that a hands-free apparatus is installed in an automotive vehicle as a device connectable with a portable phone based on the protocol of Bluetooth or other wireless communication. A portable phone connecting with this hands-free apparatus, when receives a voice signal from a telephone terminal equipment of other telephone user, can transmit the received voice signal via wireless connection to the hands-free apparatus. The automotive hands-free apparatus outputs the received voice signal via a speaker as audible voice. Furthermore, the automotive hands-free apparatus can receive a voice signal through a microphone which picks up the voice of a user (i.e. occupant) of this vehicle. Then, the automotive hands-free apparatus transmits this voice signal as a transmitted voice signal via wireless connection to the connected portable phone. The portable phone receives the transmitted voice signal, and transmits the transmitted voice signal to the telephone terminal equipment of other telephone user.

For example, the Japanese Patent Application Laid-open No. 2002-171337 discloses this kind of conventional automotive hands-free apparatus capable of performing wireless communication with a portable phone. An automotive hands-free apparatus having the capability of establishing a wireless communication line with a portable phone is advantageous in that the user can remote control his/her portable phone in a bag and accordingly the usability of the portable phone can be improved.

However, there is the possibility that an occupant in a vehicle may want to concentrate in driving the vehicle and is accordingly reluctant to respond to any incoming call in such a situation that the automotive hands-free apparatus and the portable phone are connected to each other via wireless connection. In such a case, the occupant can select a manner mode beforehand for his/her portable phone to bring the portable phone into a soundless condition, so that the portable phone cannot generate the sound when it receives an incoming call. Furthermore, if the communication line between the portable phone and the automotive hands-free apparatus is disconnected, the occupant will not be bothered with the sound of any incoming call.

However, the above described prior art document is based on a technique requiring a user to operate the portable phone to disconnect the communication line between the portable phone and the hands-free apparatus. This will force the occupant to pick his/her portable phone out of a bag or the like, and will not improve the usability of the portable phone.

SUMMARY OF THE INVENTION

In view of the above-described problems, the present invention has an object to provide an automotive hands-free apparatus which is connectable via wireless connection with a portable phone and is capable of disconnecting a communication line between the portable phone and the automotive hands-free apparatus without requiring any operation done by the user on the portable phone.

In order to accomplish the above and other related, objects, the present invention provides an automotive hands-free apparatus installed in an automotive vehicle, which is connectable via wireless connection with a portable phone. The automotive hands-free apparatus of this invention inputs a received voice signal via the wireless connection from other telephone terminal equipment communicating with the portable phone and outputs the received voice signal as audible voice. Furthermore, the automotive hands-free apparatus inputs a transmitted voice signal to be transmitted to other telephone terminal equipment based on the voice of a user in the automotive vehicle and transmits the transmitted voice signal via the wireless connection to the portable phone. Moreover, the automotive hands-free apparatus of this invention includes an input accepting means for receiving an input from the user and a disconnecting means for disconnecting the wireless connection when the input accepting means receives a user's input instructing disconnection of the wireless connection.

According to the arrangement of the automotive hands-free apparatus of this invention, the user can disconnect the wireless communication line between the portable phone and the automotive hands-free apparatus without making any operation on the portable phone.

Furthermore, it is preferable that the automotive hands-free apparatus of the present invention further includes a reconnecting means for restoring the wireless connection to the portable phone when the input accepting means receives a user's input instructing reconnection of the wireless connection to the portable phone whose wireless connection has been disconnected by the disconnecting means.

Furthermore, according to the automotive hands-free apparatus of the present invention, it is preferable that the input accepting means requires one or two-step action of user's input operation for accepting user's input instructing reconnection of the wireless connection to the portable phone, in a case that the wireless connection to this portable phone has been disconnected by the disconnecting means. With this arrangement, the user can easily accomplish the reconnection of a required communication line by making a simple operation on the automotive hands-free apparatus.

Furthermore, it is preferable that the automotive hands-free apparatus of the present invention further includes a display unit which displays reconnection information together with other information. The reconnection information indicates the presence of the portable phone whose wireless connection has been disconnected by the disconnecting means, and this portable phone is a candidate of reconnection performed by the reconnecting means. With this arrangement, the user can visually confirm the presence of any reconnection candidate.

Furthermore, it is preferable that the automotive hands-free apparatus of the present invention further includes a connection request accepting means. The connection request accepting means causes the display unit to erase the reconnection information in response to a connection request received from other portable phone, under a condition that the display unit is displaying the reconnection information. Furthermore, the connection request accepting means establishes wireless connection to the other portable phone sending the connection request.

Furthermore, according to the automotive hands-free apparatus of the present invention, it is preferable that the reconnection information displayed by the display unit is a predetermined image. The input accepting means accepts a touch input from the user through a touch panel superimposed on a display screen of the display unit. And, the reconnecting means restores the wireless connection to the portable phone whose wireless connection has been disconnected by the disconnecting means when the input accepting means confirms that the user touches a predetermined portion on the touch panel corresponding to the predetermined image.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
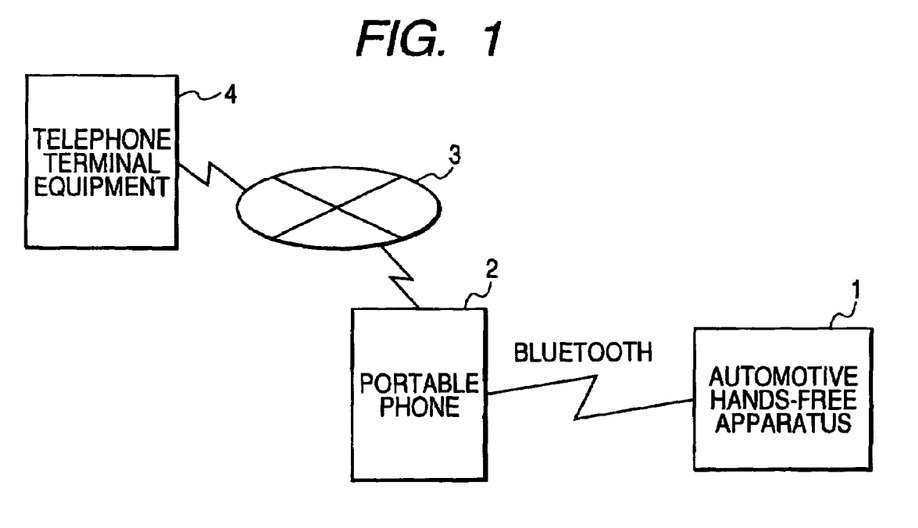
FIG. 1 is a schematic diagram showing a telephone communication system in accordance with a preferred embodiment of the present invention.

Hereinafter, a preferred embodiment of the present invention will be explained hereinafter with reference to attached drawings. FIG. 1 is a schematic diagram showing a telephone communication system in accordance with the preferred embodiment of the present invention.

An automotive hands-free apparatus 1 is installed in an automotive vehicle. A user of this automotive vehicle carries a portable phone 2. When the user is in a vehicle compartment, the automotive hands-free apparatus 1 can communicate with the portable phone 2 of the user based on the Bluetooth wireless connection.

In this case, under a condition that the portable phone 2 of the user is connected to the automotive hands-free apparatus 1, the portable phone 2 can receive a voice signal via a telephone communication network 3 from a telephone terminal equipment 4 of other telephone user. The portable phone 2 transmits the received voice signal via wireless connection to the automotive hands-free apparatus 1. The automotive hands-free apparatus 1 outputs the received voice signal through a speaker as audible voice. Furthermore, the automotive hands-free apparatus 1 can receive a voice signal through a microphone which picks up the voice of a user (i.e. occupant) of this vehicle. The automotive hands-free apparatus 1 transmits this voice signal as a transmitted voice signal via wireless connection to the portable phone 2 under the condition that the portable phone 2 is connected to the automotive hands-free apparatus 1. The portable phone 2 receives this transmitted voice signal, and transmits this transmitted voice signal via the telephone communication network 3 to the telephone terminal equipment 4 of other telephone user. In this manner, the automotive hands-free apparatus 1 of this embodiment enables the user to communicate with other telephone user carrying telephone terminal equipment 4 via the portable phone 2 and the telephone communication network 3.

Figure 2:
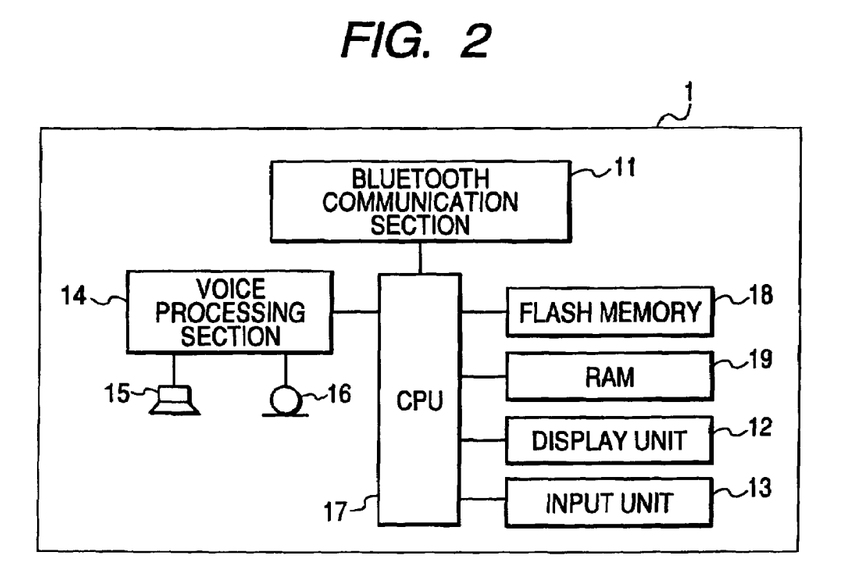
FIG. 2 is a block diagram showing an arrangement of an automotive hands-free apparatus in accordance with the preferred embodiment of the present invention.

FIG. 2 shows an arrangement of the automotive hands-free apparatus 1 performing the above-described operations. The automotive hands-free apparatus 1 includes a Bluetooth communication section 11, a display unit 12, an input unit 13, a voice processing section 14, a speaker 15, a microphone 16, a CPU 17, a flash memory 18, and a RAM 19.

The Bluetooth communication section 11, which is basically operable according to the control of CPU 17, is capable of realizing wireless connection with the portable phone 2 or other portable phones. The Bluetooth communication section 11 has a Bluetooth antenna (not shown) to receive a signal from a portable phone of another user, and executes various processing for the received signal, such as amplification, frequency conversion, demodulation, and A/D conversion, in compliance with the predetermined Bluetooth wireless communication protocol. The result of the processing performed in the Bluetooth communication section 11 is sent to the CPU 17.

Furthermore, the Bluetooth communication section 11 inputs data from the CPU 17, and executes various processing for the received data, such as D/A conversion, modulation, frequency conversion, amplification, in compliance with the predetermined Bluetooth wireless communication protocol. The signal representing the result of the processing performed in the Bluetooth communication section 11 is transmitted via the Bluetooth antenna to the portable phone of another user. Moreover, the Bluetooth communication section 11 can disconnect the communication line to the currently communicating portable phone according to the control of CPU 17.

The display unit 12, including a liquid crystal display device, can display the display data produced from the CPU 17 on its display screen.

The input unit 13, including push buttons or comparable mechanical switches and a touch panel overlapping with the display screen of the display unit 12, can send an input signal to the CPU 17 based on user's operation applied on the push buttons or the touch panel.

The voice processing section 14 can convert a digital voice signal entered from the CPU 17 into an analog voice signal and then output the converted analog voice signal to the speaker 15. Furthermore, the voice processing section 14 can convert an analog voice signal entered from the microphone 16 into a digital voice signal and output the converted digital voice signal to the CPU 17.

The CPU 17 can execute a program read out of the flash memory 18. Furthermore, the CPU 17 executes various operations based on the executing program, the signal entered from the Bluetooth communication section 11, the signal entered from the input unit 13, and the digital voice signal entered from the voice processing section 14. Furthermore, if necessary, the CPU 17 can write or read information into or from the. RAM 19, and output a transmit signal to the Bluetooth communication section 11 and also output a digital voice data to the voice processing section 14. Furthermore, if necessary, the CPU 17 can control connection and disconnection of the Bluetooth communication section 11 with other portable phone.

A hands-free communication program is one of the programs being read out from the flash memory 18 and executed by the CPU 17. When the Bluetooth communication section 11 is connection by wireless with the portable phone 2, the hands-free communication program enables the CPU 17 to realize the following operations.

First of all, when the portable phone 2 receives an incoming call, the portable phone 2 transmits a signal indicating acceptance of this incoming call by wireless to the CPU 17. The CPU 17, in response to the signal received from the portable phone 2 and user's (i.e. vehicle occupant's) permission entered through the input unit 13, transmits a signal instructing initiation of communication relating to the incoming call to the portable phone 2 via the Bluetooth communication section 11. The portable phone 2, when receives the signal returned from the CPU 17, establishes a communication line and notifies the CPU 17 of this establishment via the Bluetooth communication section 11. The CPU 17 receives this notification and realizes communication with the telephone terminal equipment 4, by using the established communication line.

Furthermore, when the user enters a telephone number through the input unit 13, the CPU 17 receives a signal indicating user's intent to make a telephone call to this telephone number. In this case, the CPU 17 instructs the portable phone 2 to call the telephone terminal equipment 4 of this telephone number via the Bluetooth communication section 11. The portable phone 2 calls telephone terminal equipment 4 in response to this instruction. Then, the portable phone 2 transmits a notification indicating establishment of the communication line to the telephone terminal equipment 4 to the CPU 17 via the Bluetooth communication section 11. The CPU 17 realizes communication with the telephone terminal equipment 4 by using the established communication line in response to this notification.

Hereinafter, realization of communication with the telephone terminal equipment 4 is explained in more detail. When the portable phone 2 receives a voice signal from the telephone terminal equipment 4, the portable phone 2 transmits the received voice signal via wireless connection to the automotive hands-free apparatus 1. Then, the CPU 17 outputs the received voice signal, as a digital voice signal, to the voice processing section 14. The speaker 15 outputs the received voice. Furthermore, the CPU 17 receives a voice signal, i.e. digital voice data, of the vehicle occupant via the microphone 16 and the voice processing section 14. The CPU 17 transmits this voice signal, as a transmitted voice signal, via wireless connection to the portable phone 2. When the portable phone 2 receives this transmitted voice signal, the portable phone 2 transmits this transmitted voice signal to the telephone terminal equipment 4 of other telephone user via the telephone communication network 3. Accordingly, the automotive hands-free apparatus 1 of this embodiment enables the vehicle occupant to communicate with the user of the telephone terminal equipment 4 via the portable phone 2 and the telephone communication network 3.

Furthermore, the CPU 17 of this embodiment executes a Bluetooth connection setting program other than the above-described hands-free communication program. The CPU 17 executes the Bluetooth connection setting program in response to predetermined steps of operations performed by the occupant through the input unit 13. By executing the Bluetooth connection setting program, the CPU 17 can cause the display unit 12 to display a connection setting screen.

Figure 3:
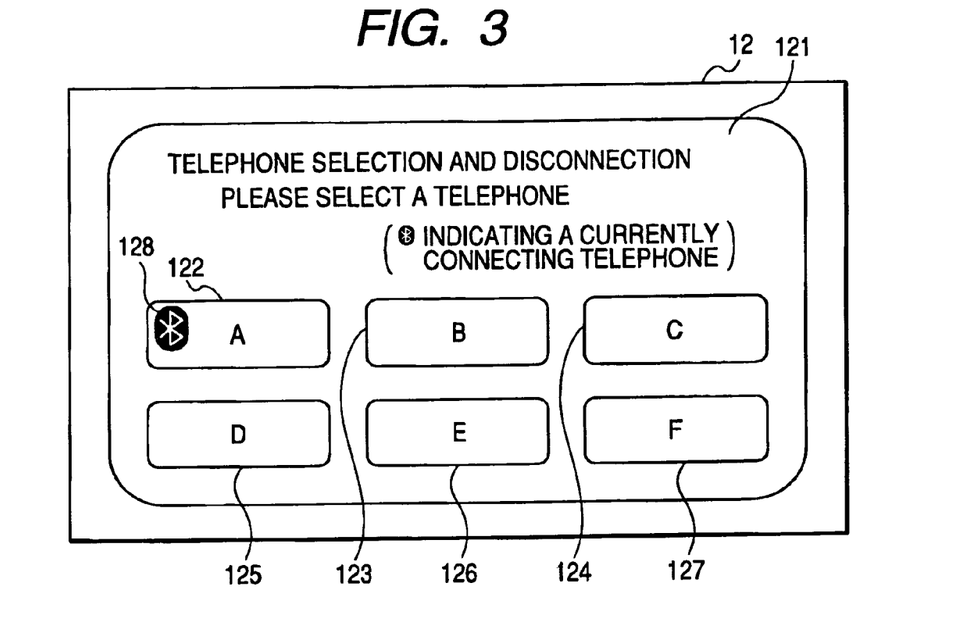
FIG. 3 is a view showing a display unit performing display of a connection setting screen in accordance with the preferred embodiment of the present invention.

FIG. 3 shows a connection setting screen displayed by the display unit 12. The display unit 12 displays character strings of predetermined messages on its display screen 121, such as "TELEPHONE SELECTION AND DISCONNECTION" and "PLEASE SELECT A TELEPHONE" shown in FIG. 3, to encourage the user (i.e. vehicle occupant) to select a portable phone to be connected or disconnected by the Bluetooth communication section 11. Furthermore, the display unit 12 displays a plurality of buttons, i.e. A button 122, B button 123, C button 124, D button 125, E button 126, and F button 127. Each button corresponds to a portable phone having been registered beforehand in the flash memory 1.8 of the automotive hands-free apparatus 1. In FIG. 3, a predetermined image (hereinafter, referred to BT mark) 128 is superimposed on the display of A button 122. The BT mark 128 indicates the state of Bluetooth connection. According to the condition shown in FIG. 3, the Bluetooth communication section 11 is presently connecting via wireless connection with the portable phone corresponding to the button A.

The occupant can select each of these plural (i.e. A through F) buttons by touching a corresponding display position on the touch panel of the input unit 13. When the occupant touches one of A through F buttons on the touch panel, the CPU 17 identifies the button having been selected by the touch of the occupant. And, the CPU 17 executes the processing based on the identified button.

More specifically, when the occupant touches any button on which no BT mark is superimposed, the CPU 1.7 controls the Bluetooth communication section 11 to disconnect the communication line to the currently communicating portable phone. Furthermore, the CPU 17 controls the Bluetooth communication section 11 to connect a communication line to the portable phone corresponding to the button selected by the occupant.

Figure 4:
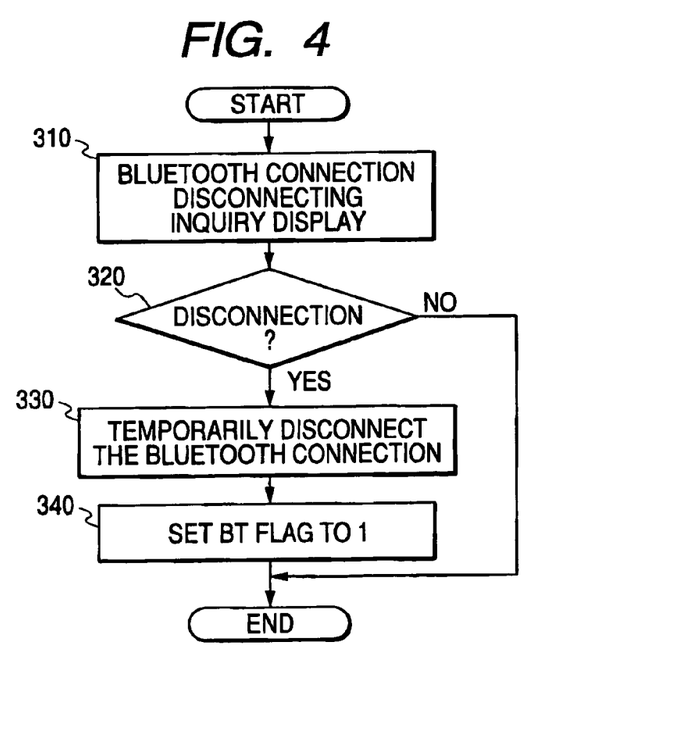
FIG. 4 is a flowchart of a program executed by CPU when a user touches a button overlapped with a BT mark on the connection setting screen in accordance with the preferred embodiment of the present invention.

Furthermore, when the occupant touches the button on which the BT mark 128 is superimposed, the CPU 17 executes a program shown in FIG. 4. First in step 310, the CPU 17 controls the display unit 12 to execute a Bluetooth: connection disconnecting inquiry display. More specifically, the CPU 17 causes the display unit 12 to display a predetermined screen which encourages the occupant to select either "connection" or "disconnection". Then, the CPU 17 waits for a while until the occupant operates the input unit 13 to enter his/her preference.

If any selection is entered by the occupant, the CPU 17 proceeds to the next step 320 to make a judgment as to whether or not the occupant's selection is disconnection. When the judgment result in step 320 is NO, it means that the occupant requests maintaining the present communication line. Accordingly, the CPU 17 terminates this routine.

When the occupant's selection is "disconnection" (i.e. YES in step 320), the CPU 17 proceeds to the next step 330 to temporarily disconnect the Bluetooth connection. More specifically, the CPU 17 controls the Bluetooth communication section 11 to disconnect the present wireless connection. Then, the CPU 17 stores reconnection candidate information in the RAM 19 which is identification data representing the portable phone whose wireless connection is just disconnected.

Next, the CPU 17 proceeds to step 340 to set a BT flag to 1. The BT flag is a variable secured in a predetermined memory region of the RAM 19. The value of this BT flag is used in the display processing of the BT mark 128 in a later-described program. The BT flag is a variable indicating the present state of wireless connection of the automotive hands-free apparatus 1. When the BT flag is 0, the wireless connection of the automotive hands-free apparatus 1 is completely disconnected. When the BT flag is 1, the wireless connection of the automotive hands-free apparatus 1 is temporarily disconnected. When the BT flag is 2, the wireless connection of the automotive hands-free apparatus 1 is established. In this case, the expression "the state of wireless connection being temporarily disconnected" represents the condition that the automotive hands-free apparatus 1 can restore the state of wireless connection to the previous connecting condition having been disconnected immediately before by a simple occupant's operation (for example, one- or two-step action). In this respect, "the state of wireless connection being temporarily disconnected" can be referred to as a hold condition of wireless connection.

After finishing the step 340, the CPU 17 terminates the routine of the program shown in FIG. 4.

Through the execution of the above-described program, the CPU 17 can disconnect the wireless connection based on the occupant's intent entered from the input unit 13 when the occupant requests disconnection of wireless connection. According to the above-described operation of the automotive hands-free apparatus 1 being connected by wireless with the portable phone 2, the automotive hands-free apparatus 1 can disconnect the connection between the portable phone 2 and the automotive hands-free apparatus 1 without requiring any operation of the portable phone 2.

Figure 5:
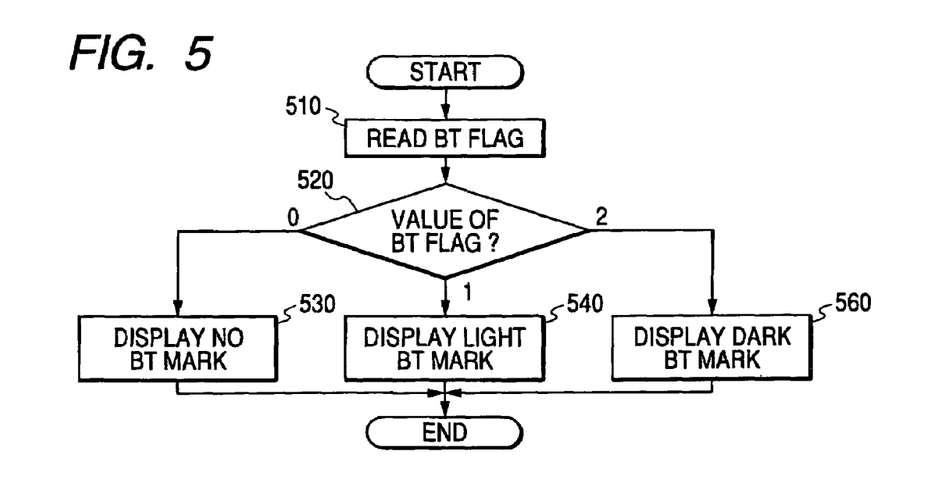
FIG. 5 is a flowchart showing a program for displaying the BT mark in a specific screen other than the connection setting screen in accordance with the preferred embodiment of the present invention.

Next, a program for displaying the BT mark in a specific screen other than the above-described connection setting screen will be explained. FIG. 5 shows a flowchart of this program. The CPU 17 executes this program at short intervals (e.g. at the cycle of 0.1 sec).

First of all, in step 510, the CPU 17 reads out the value of BT flag stored in the RAM 19.

Next, the CPU 17 proceeds to step 520 to make a judgment as to whether the value of readout BT flag is 0 or 1, or 2.

When the BT flag is 2, the CPU 17 proceeds to step 560 to control the display unit 12 to display a dark BT mark.

Figure 6:
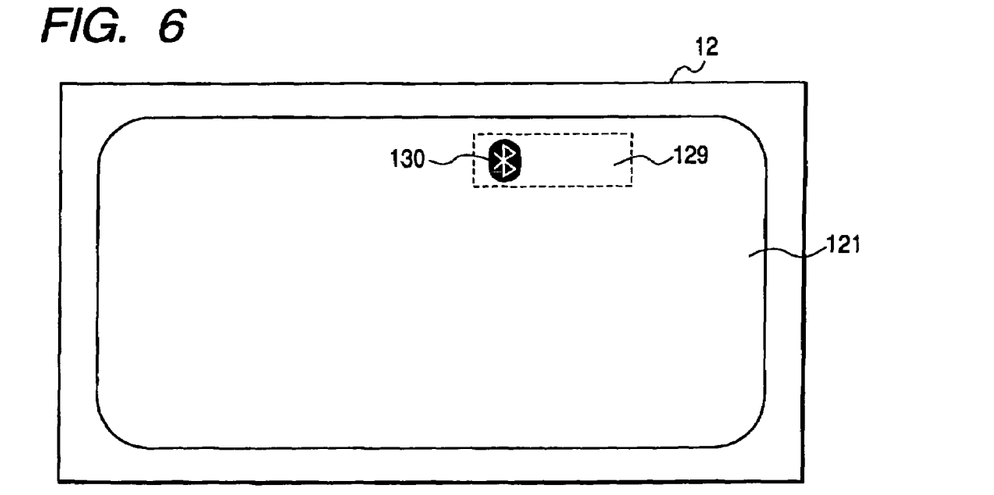
FIG. 6 is a view showing a display unit displaying an example of the BT mark in accordance with the preferred embodiment of the present invention.

FIG. 6 shows a practical example of this BT mark displayed by the display unit 12. More specifically, when the CPU 17 executes the step 520, a BT mark 130 is displayed in a telephone status display section 129 provided as a small area positioned at the upper right portion on the display screen 121. Although not shown in the drawing, the CPU 17 causes the display unit 12 to display information relating to the radio wave environment of wireless communication in the telephone status displaying section 129 together with the display of BT mark 130. Furthermore, the CPU 17 can display information of a telephone number list or the like in other region of the display screen 121 (although not shown in FIG. 6). For the purpose of clearly indicating the region of the telephone status displaying section 129, FIG. 6 shows a rectangular dotted frame although the actual display unit does not displays such a frame.

After finishing the step 560, the CPU 17 terminates the routine of the program shown in FIG. 5.

Figure 7:
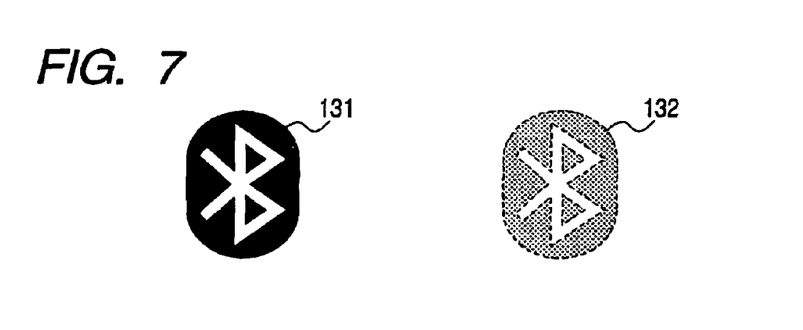
FIG. 7 is a view showing a dark BT mark and a light BT mark in accordance with the preferred embodiment of the present invention.

When the BT flag is 1 in step 520, the CPU 17 proceeds to step 540 to control the display unit 12 to display a light BT mark. The display position of the light BT mark is the same as the position of BT mark 130 shown in FIG. 6. FIG. 7 shows a dark BT mark 131 to be displayed in step 560 and a light BT mark 132 to be displayed in step 540. As apparent from FIG. 7, lightness of the light BT mark 132 should be discriminable compared with the dark BT mark 131.

After finishing the step 540, the CPU 17 terminates the routine of the program shown in FIG. 5.

When the BT flag is 0 in step 520, the CPU 17 proceeds to step 530 to control the display unit 12 to display no BT mark. More specifically, the CPU 17 causes the display unit 12 to stop displaying the dark or light BT mark if such a mark is displayed in the telephone status displaying section 129 as a result of preceding execution in the step 540 or step 560. After finishing the step 530, the CPU 17 terminates the routine of the program shown in FIG. 5.

By repetitively executing the program shown in FIG. 5, the display unit 12 always displays the dark BT mark together with other information in the telephone status displaying section 129, i.e. in a small region on the display screen 121 of the display unit 12, when the BT flag is 2, i.e. when the wireless connection is established between the automotive hands-free apparatus 11 and the portable phone. Furthermore, the display unit 12 always displays the light BT mark together with other information in the telephone status displaying section 129, when the BT flag is 1, i.e. when the wireless connection is temporarily disconnected between the automotive hands-free apparatus 1 and the portable phone.

According to the display method of this embodiment, the occupant can visually confirm the presence of the portable phone 2 as a reconnection object (i.e. candidate) or as a presently communicating object.

Figure 8:
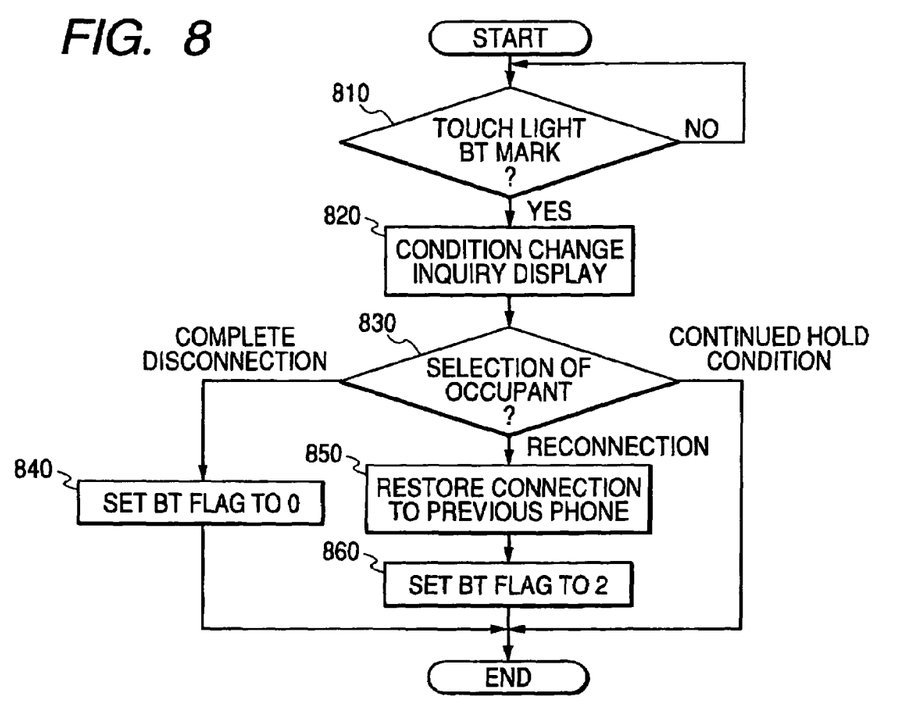
FIG. 8 is a flowchart showing a reconnection program in accordance with the preferred embodiment of the present invention.

FIG. 8 is a flowchart showing a reconnection program. The CPU 17 executes this reconnection program periodically (e.g. at the cycle of 1 second). First of all, in step 810, the CPU 17 makes a judgment as to whether or not the occupant touches the light Bluetooth mark. More specifically, when the BT flag is 1 and the occupant touches a predetermined position of the touch panel where the light Bluetooth mark is displayed, i.e. the position of the BT mark 130 in the telephone status displaying section 129 on the display screen 121 shown in FIG. 6, the CPU 17 confirms the occupant's intent to select the light BT mark. In other cases, the CPU 17 suspends the decision with respect to occupant's touch to the light BT mark. The CPU 17 repetitively executes the step 810 until the decision of occupant's touch to the light BT mark is made.

When the occupant has touched the light BT mark, the CPU 17 proceeds to step 820 to control the display unit 12 to execute condition change inquiry display. More specifically, the condition change inquiry displayed by the display unit 12 encourages the occupant to select one of a plurality of options: such as, re-establishing the wireless connection; completely disconnecting the wireless connection; and continuing the hold condition.

Furthermore, this embodiment enables the occupant to select a desirable option by making a simple operation (e.g. one-step action) on the input unit 13. For example, the display unit 12 displays three buttons on the touch panel, so as to correspond to the above described three selectable options. When the occupant touches any one of the displayed buttons, the CPU 17 can decide that the occupant has selected the option corresponding to the touched button.

In this step 820, the CPU 17 waits for a while until selection of a desirable option is made by the occupant. When the occupant's selection is confirmed, the CPU 17 proceeds to the next step 830.

In step 830, the CPU 17 makes a judgment as to whether the occupant's selection is "complete disconnection" or "reconnection", or "continued hold condition." When the occupant's selection is "continued hold condition", the CPU 17 terminates the execution of the reconnection program shown in FIG. 8.

When the occupant's selection is "complete disconnection", the CPU 17 proceeds to step 840 to reset the BT flag to 0 and erase the reconnection candidate information from the RAM 19. Then, the CPU 17 terminates the execution of the reconnection program shown in FIG. 8.

When the occupant's selection is "reconnection", the CPU 17 proceeds to step 850 to control the Bluetooth communication section 11 to restore the connection to the portable phone which is memorized in the reconnection candidate information as a portable phone whose wireless connection has been disconnected immediately before.

Subsequently, the CPU 17 proceeds to step 860 to set the BT flag to 2. Then, after accomplishing the processing of step-860, the CPU 17 terminates the execution of the reconnection program shown in FIG. 8.

As apparent from the foregoing description, when the CPU 17 executes the above-described reconnection program in a situation that the wireless connection is in the hold condition, the occupant can easily change the wireless connection from the hold condition to the established condition by touching the light BT mark and also by making a simple operation (e.g. one-step action) instructing the reconnection, namely by making two-step operations in total.

As apparent from the foregoing description, this embodiment enables the user to realize reconnection of wireless connection by making a simple operation on the automotive hands-free apparatus 1.

Figure 9:
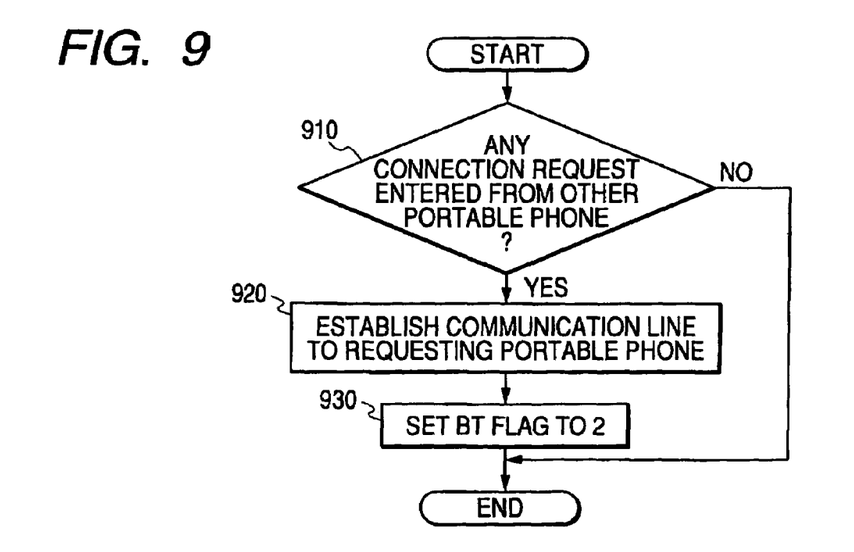
FIG. 9 is a flowchart showing an external device connecting program in accordance with the preferred embodiment of the present invention.

Next, the external device connecting program executed by the CPU 17 will be explained. FIG. 9 is a flowchart showing this program. The CPU 17 executes the external device connecting program repetitively (e.g. at the cycle of 1 second), only when the BT flag is 1.

First of all, in step 910, the CPU 17 makes a judgment as to whether or not any connection request is entered from other portable phone to the Bluetooth communication section 11. In this case, "other portable phone" does not include the portable phone memorized in the reconnection candidate information. When there is no connection request, the CPU 17 terminates the execution of the external device connecting program shown in FIG. 9.

When any connection request is entered from other portable phone to the Bluetooth communication section 11, the CPU 17 proceeds to the next step 920 to control the Bluetooth communication section 11 to establish a communication line to the portable phone having sent the connection request.

Next, in step 930, the CPU 17 sets the BT flag to 2 and erases the reconnection candidate information from the RAM 19.

After accomplishing the processing of step 930, the CPU 17 terminates the execution of the external device connecting program shown in FIG. 9.

As apparent from the foregoing description, the CPU 17 executes the above-described external device connecting program in a situation that the wireless connection is in the hold condition. If any connection request is received from other portable phone in this holding condition, the CPU 17 can completely disconnect the currently holding connection and newly establish wireless connection to other portable phone having sent the connection request.

Figure 10:
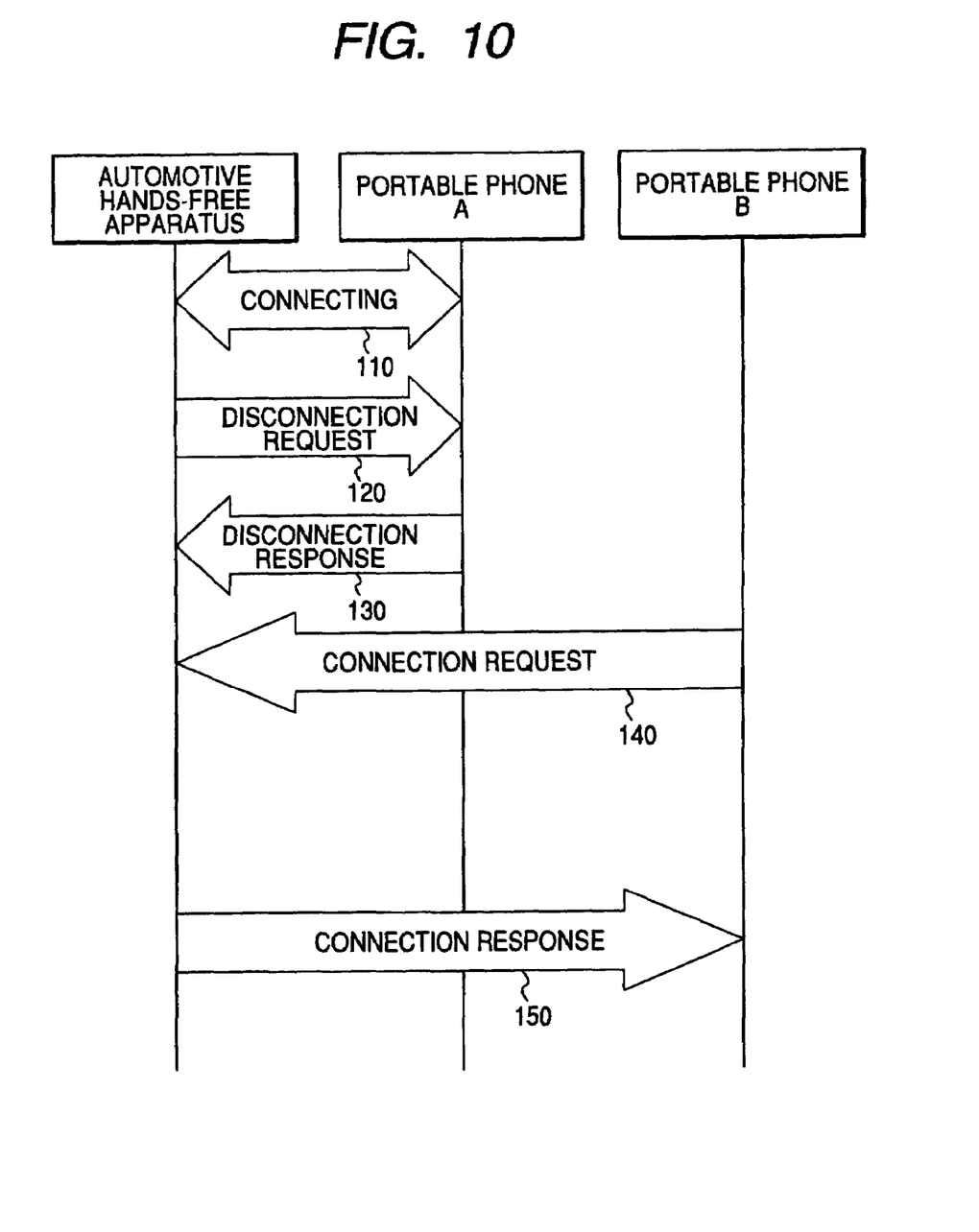
FIG. 10 is a sequence diagram showing an operation of the automotive hands-free apparatus in accordance with the preferred embodiment of the present invention.

FIG. 10 is a sequence diagram showing an example of the operation performed by the above-described automotive hands-free apparatus 1.

First, when the wireless connection is established between the automotive hands-free apparatus 1 and a portable phone A (i.e. process 110), the occupant may instruct through the input unit 13 to temporarily disconnect the connection to the portable phone A. In this case, the Bluetooth communication section 11 of the automotive hands-free apparatus 1 transmits a disconnection request signal 120 to the portable phone A and subsequently receives a disconnection response signal 130 returned from the portable phone A. Then, the automotive hands-free apparatus 1 accomplishes disconnecting the portable phone 2.

If a connection request 140 is sent from a portable phone B other than the portable phone A in the connection hold condition, the Bluetooth communication section 11 of the automotive hands-free apparatus can execute the processing of FIG. 9 to cancel the connection hold condition between the automotive hands-free apparatus 1 and the portable phone A. Then, the Bluetooth communication section 11 can send a connection response 150 to the portable phone 2 to newly establish the connection to the portable phone B.

In the above-described embodiment, the input unit 13 corresponds to the input accepting means of the present invention.

Furthermore, by executing the program shown in FIG. 4, the CPU 17 can function as the disconnecting means of the present invention.

Furthermore, by executing the processing of steps 850 and 860 in FIG. 8, the CPU 1.7 can function as the reconnecting means of the present invention.

Furthermore, by executing the program shown in FIG. 9, the CPU 17 can arrange the connection request accepting means of the present invention.

What is claimed is:

1. An automotive hands-free apparatus installed in an automotive vehicle and connectable via wireless connection with a portable phone, for inputting a received voice signal via said wireless connection from other telephone terminal eguipment communicating with said portable phone and outputting the received voice signal as audible voice, and further for inputting a transmitted voice signal to be transmitted to said other telephone terminal equipment based on voice of a user in said automotive vehicle and transmitting the transmitted voice signal via said wireless connection to said portable phone, said automotive hands-free apparatus comprising:

input accepting means for receiving an input from said user;

disconnecting means for disconnecting said wireless connection when said input accepting means receives a user's input instructing disconnection of said wireless connection;

reconnecting means for restoring said wireless connection to said portable phone when said input accepting means receives a user's input instructing reconnection of the wireless connection to said portable phone whose wireless connection has been disconnected by said disconnecting means;

a display unit which discriminatively displays reconnection information together with other information, wherein said reconnection information indicates the presence of the portable phone whose wireless connection has been disconnected by said disconnecting means, and said portable phone is a candidate of reconnection performed by said reconnecting means; and connection request accepting means for causing said display unit to erase said reconnection information in response to a connection request received from an other portable phone under a condition that said display unit is displaying said reconnection information, and for establishing wireless connection to said other portable phone sending said connection request; wherein said input accepting means reguires one or two-step action of user's input operation for accepting said user's input instructing reconnection of the wireless connection to said portable phone whose wireless connection has been disconnected by said disconnecting means.

2. The automotive hands-free apparatus in accordance with claim 1, wherein only the user can initiate reconnection between said portable phone and said automotive hands-free apparatus.

3. An automotive hands-free apparatus installed in an automotive vehicle and connectable via wireless connection with a portable phone, for inputting a received voice signal via said wireless connection from other telephone terminal equipment communicating with said portable phone and outputting the received voice signal as audible voice, and further for inputting a transmitted voice signal to be transmitted to said other telephone terminal equipment based on voice of a user in said automotive vehicle and transmitting the transmitted voice signal via said wireless connection to said portable phone, said automotive hands-free apparatus comprising:

input accepting means for receiving an input from said user;

disconnecting means for disconnecting said wireless connection when said input accepting means receives a user's input instructing disconnection of said wireless connection;

reconnecting means for restoring said wireless connection to said portable phone when said input accepting means receives a user's input instructing reconnection of the wireless connection to said portable phone whose wireless connection has been disconnected by said disconnecting means; and a display unit which discriminatively displays reconnection information together with other information, wherein said reconnection information indicates the presence of the portable phone whose wireless connection has been disconnected by said disconnecting means, and said portable phone is a candidate of reconnection performed by said reconnecting means; wherein said input accepting means requires one or two-step action of user's input operation for accepting said user's input instructing reconnection of the wireless connection to said portable phone whose wireless connection has been disconnected by said disconnecting means; and the reconnection information displayed by said display unit is a predetermined image, said input accepting means accepts a touch input from said user through a touch panel superimposed on a display screen of said display unit, and said reconnecting means restores the wireless connection to said portable phone whose wireless connection has been disconnected by said disconnecting means when said input accepting means confirms that said user touches a predetermined portion on said touch panel corresponding to said predetermined image.

4. The automotive hands-free apparatus in accordance with claim 3, wherein only the user can initiate reconnection between said portable phone and said automotive hands-free apparatus.

* * * * *